US009784280B2

(12) United States Patent
Yin

(10) Patent No.: US 9,784,280 B2
(45) Date of Patent: Oct. 10, 2017

(54) FAN DEVICE WITH OIL-RETAINING BEARING

(71) Applicant: ASIA VITAL COMPONENTS (CHENGDU) CO., LTD., Chengdu, Sichuan Province (CN)

(72) Inventor: Guan-Chen Yin, Chengdu (CN)

(73) Assignee: Asia Vital Components (Chengdu) Co., Ltd., Chengdu (CN)

( * ) Notice: Subject to any disclaimer, the term of this patent is extended or adjusted under 35 U.S.C. 154(b) by 287 days.

(21) Appl. No.: 14/538,815

(22) Filed: Nov. 12, 2014

(65) Prior Publication Data

US 2016/0131149 A1    May 12, 2016

(51) Int. Cl.
| | |
|---|---|
| *F04D 29/056* | (2006.01) |
| *F04D 29/063* | (2006.01) |
| *F16C 17/02* | (2006.01) |
| *F04D 25/06* | (2006.01) |
| *F16C 35/02* | (2006.01) |
| *F16C 33/10* | (2006.01) |
| *F16C 17/24* | (2006.01) |

(52) U.S. Cl.
CPC ......... *F04D 29/063* (2013.01); *F04D 25/062* (2013.01); *F16C 17/02* (2013.01); *F16C 33/104* (2013.01); *F16C 35/02* (2013.01); *F16C 17/243* (2013.01); *F16C 2226/12* (2013.01); *F16C 2360/46* (2013.01)

(58) Field of Classification Search
CPC ..... H02K 5/1675; F04D 29/056; F04D 29/53; F04D 29/59; F04D 25/062; F04D 25/0626
See application file for complete search history.

(56) References Cited

U.S. PATENT DOCUMENTS

| | | | |
|---|---|---|---|
| 6,592,263 B2* | 7/2003 | Chuang | F04D 29/051 384/125 |
| 2011/0285231 A1* | 11/2011 | Rehm | F16C 17/107 310/90 |

FOREIGN PATENT DOCUMENTS

CN       202251044 U     5/2012

\* cited by examiner

*Primary Examiner* — Woody Lee, Jr.
(74) *Attorney, Agent, or Firm* — C. G. Mersereau; Nikolai & Mersereau, P.A.

(57) ABSTRACT

A fan device with oil-retaining bearing includes a base seat and an oil-retaining bearing. The base seat has a central tubular section and a bearing cup extending from the central tubular section to one side. The bearing cup has an internal bearing hole. The central tubular section has at least one mating section in adjacency to the bearing hole. The oil-retaining bearing is disposed in the bearing hole. The oil-retaining bearing has at least one connection section mated with the mating section. The connection section and the mating section are mated with each other so that the oil-retaining bearing is securely disposed in the bearing hole. In addition, the operation of the shaft will not be affected due to the press fit and the difficulty in controlling the glue dispensing process.

3 Claims, 8 Drawing Sheets

FAN DEVICE WITH OIL-RETAINING BEARING

BACKGROUND OF THE INVENTION

1. Field of the Invention

The present invention relates generally to a fan device with oil-retaining bearing, and more particularly to a fan device with oil-retaining bearing, in which the oil-retaining bearing is securely disposed in the bearing hole and the operation of the shaft will not be affected due to the press fit and the difficulty in controlling the glue dispensing process.

2. Description of the Related Art

Currently, electronic information produces (such as computers) have been more and more popularly used. The electronic information industries and technologies rapidly develop on the demand of consumers. There is a trend to enhance the execution/operation speed of the electronic products and increase the access capacity of the electronic products. As a result, the components in the electronic information produces often generate high heat in high-speed operation.

With a computer mainframe taken as an example, most of the heat is generated by the central processing unit (CPU) of the computer mainframe. In the case that the heat is not dissipated in time, the temperature of the CPU will rise to cause deterioration of the execution performance of the CPU. When the heat accumulates to an extent higher than the tolerance limit, the computer will crash or even burn out. Moreover, in order to solve the problem of electromagnetic radiation, the computer mainframe is generally enclosed in a computer case. Therefore, it has become a critical issue how to quickly dissipate the heat generated by the CPU and other heat generation components.

In general, a heat sink and cooling fan are disposed on the CPU to dissipate the heat generated by the CPU. Several radiating fins are disposed on one side of the heat sink. The surface of the other side of the heat sink (free from any radiating fin) is in direct contact with the CPU. Accordingly, the heat can be conducted to the radiating fins and quickly dissipated by way of radiation. The cooling fan serves to cooperatively forcedly drive airflow to quickly dissipate the heat.

Please refer to FIGS. 1A and 1B. FIG. 1A is a sectional assembled view of a conventional cooling fan with oil-retaining bearing in one aspect. FIG. 1B is a sectional assembled view of a conventional cooling fan with oil-retaining bearing in another aspect. The cooling fan 1 mainly has a fan base seat 11. A bearing cup 111 is disposed on the fan base seat 11. An oil-retaining bearing 12 is disposed in the bearing cup 111. A fan impeller 13 is assembled on the fan base seat 11. The fan impeller 13 has multiple blades 131 annularly arranged on outer circumference of the fan impeller 13. A shaft 132 extends from an inner side of the fan impeller 13. The shaft 132 is fitted through the shaft hole 121 of the oil-retaining bearing 12 and latched and located therein. When the cooling fan 1 operates, the shaft 132 stably rotates within the oil-retaining bearing 12. The oil-retaining bearing 12 is fixedly disposed in the bearing cup 111 in two manners. FIG. 1A shows a first way to fix the oil-retaining bearing 12 in the bearing cup 111. That is, a glue dispensing process is performed between the oil-retaining bearing 12 and the bearing cup 111. In the glue dispensing process, the glue 14 may flow through the gap between the oil-retaining bearing 12 and the bearing cup 111 to the shaft hole 121. As a result, when the shaft 132 rotates within the oil-retaining bearing 12, the shaft 132 will make noise and may clog. FIG. 1B shows a second way to fix the oil-retaining bearing 12 in the bearing cup 111. That is, the outer circumference of the oil-retaining bearing 12 is tightly fitted in the inner circumference of the bearing cup 111 by means of press fit. When the oil-retaining bearing 12 is tightly fitted into the bearing cup 111, the shaft hole 121 of the oil-retaining bearing 12 will be contracted to compress the shaft 132. This will affect the normal assembly of the shaft 132 in the shaft hole 121 and the operation of the shaft 132 or even lead to clog of the shaft 132.

According to the above, the conventional cooling fan has the following shortcomings:
1. The glue dispensing process is hard to control so that the shaft will make noise and may clog.
2. When the oil-retaining bearing is tightly fitted into the bearing cup, the shaft hole of the oil-retaining bearing will be contracted to compress the shaft. This will affect the normal assembly of the shaft or even lead to clog of the shaft.

SUMMARY OF THE INVENTION

It is therefore a primary object of the present invention to provide a fan device with oil-retaining bearing, in which the oil-retaining bearing is securely disposed in the bearing hole and the operation of the shaft will not be affected due to the press fit and the difficulty in controlling the glue dispensing process.

It is a further object of the present invention to provide the above fan device with oil-retaining bearing, which has longer lifetime.

It is still a further object of the present invention to provide the above fan device with oil-retaining bearing, which can effectively lower the assembling cost.

To achieve the above and other objects, the fan device with oil-retaining bearing of the present invention includes a base seat, an oil-retaining bearing and a stator assembly. The base seat has a central tubular section and a bearing cup extending from the central tubular section to one side. The bearing cup has a bearing hole. The central tubular section has at least one mating section in adjacency to the bearing hole. The oil-retaining bearing is disposed in the bearing hole. The oil-retaining bearing has at least one connection section mated with the mating section. The stator assembly is fitted around the bearing cup. The connection section and the mating section are mated with each other so that the oil-retaining bearing is securely disposed in the bearing hole. In addition, the operation of the shaft will not be affected due to the press fit and the difficulty in controlling the glue dispensing process.

According to the above, the present invention has the following advantages:
1. The oil-retaining bearing is securely disposed in the bearing hole.
2. The operation of the shaft will not be affected due to the press fit.
3. The problem that it is hard to control the glue dispensing process is solved.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
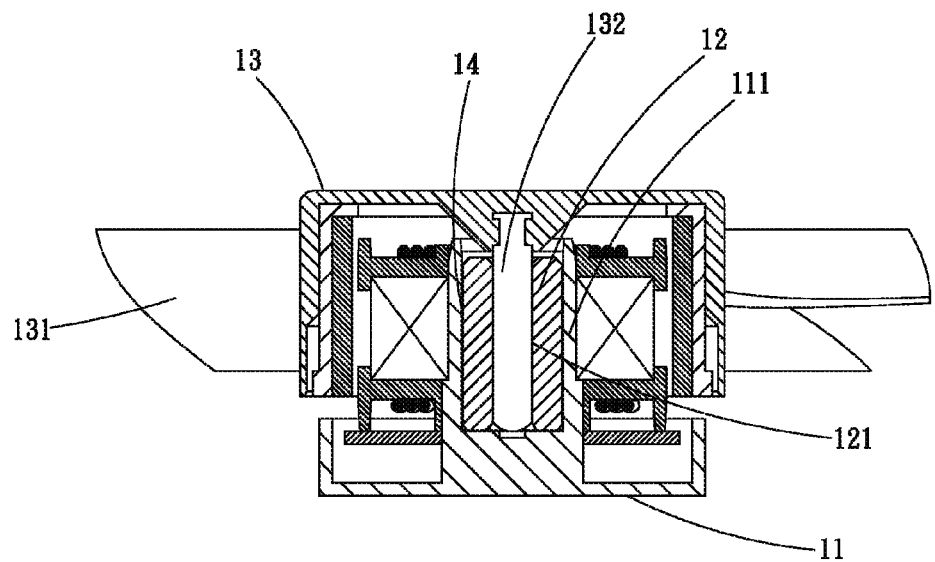
FIG. 1A is a sectional assembled view of a conventional cooling fan with oil-retaining bearing in one aspect.
Figure 1B:
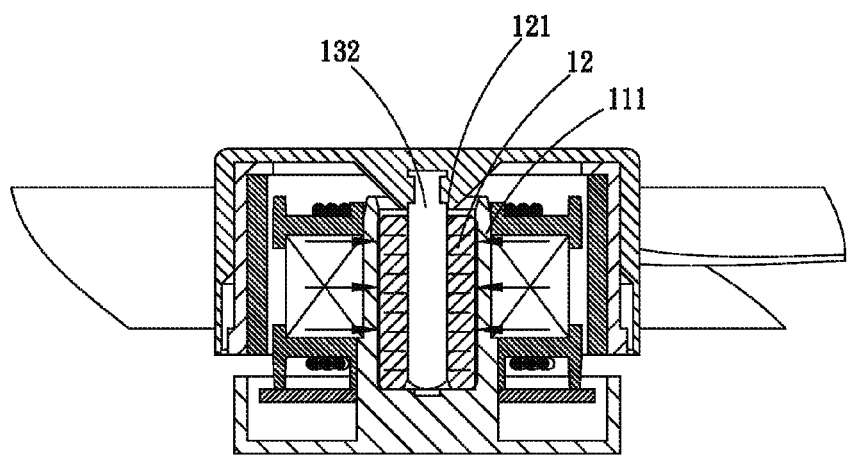
FIG. 1B is a sectional assembled view of a conventional cooling fan with oil-retaining bearing in another aspect.
Figure 2A:
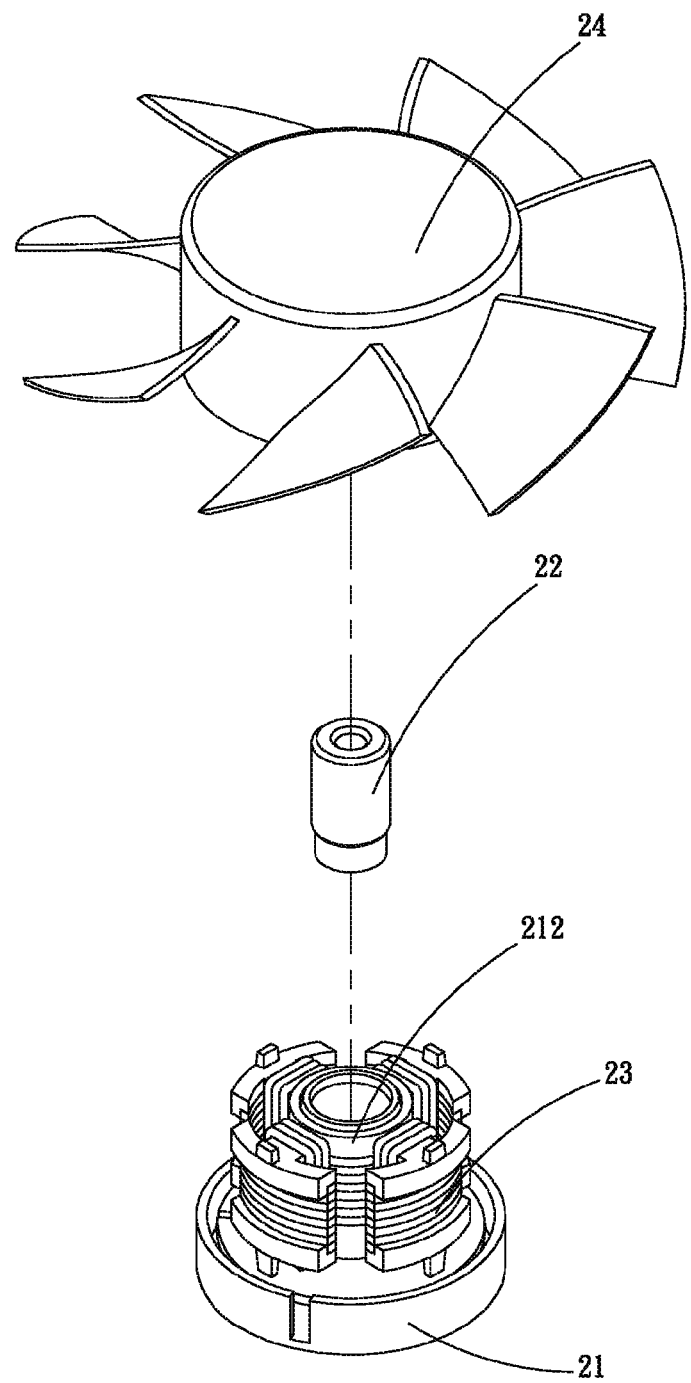
FIG. 2A is a perspective exploded view of a first embodiment of the present invention.
Figure 2B:
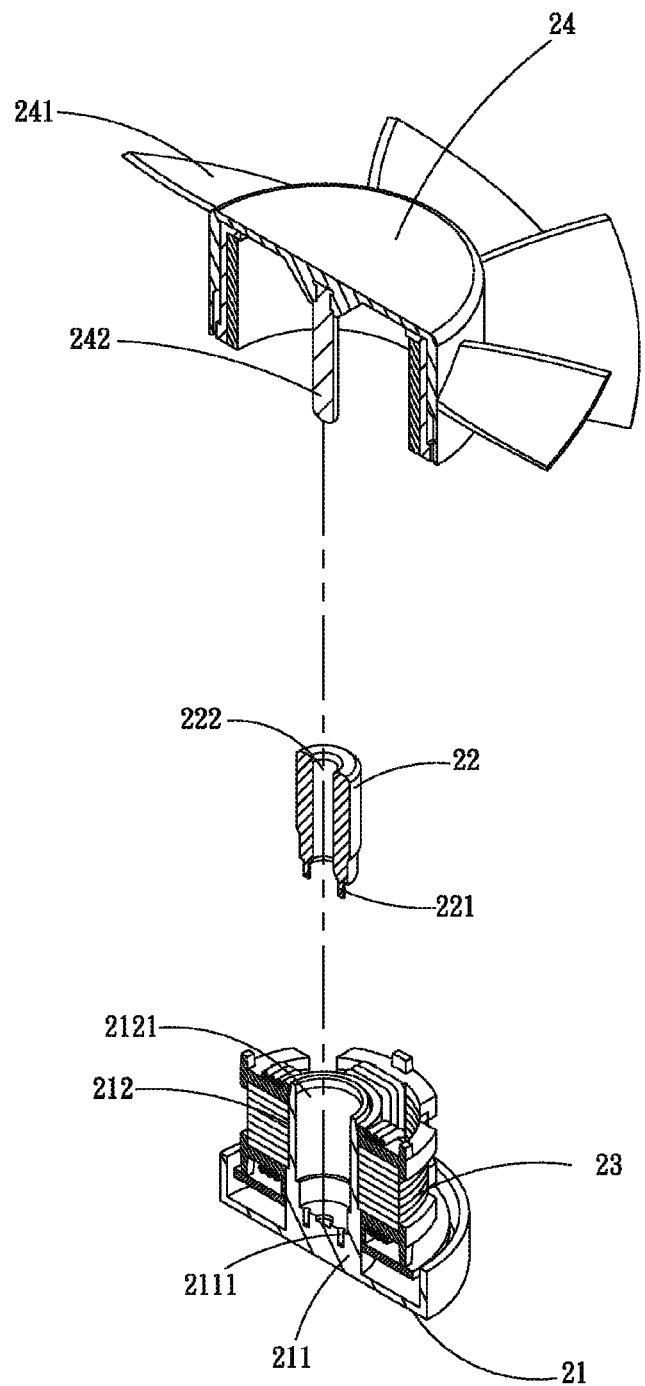
FIG. 2B is a perspective sectional exploded view of the first embodiment of the present invention.
Figure 2C:
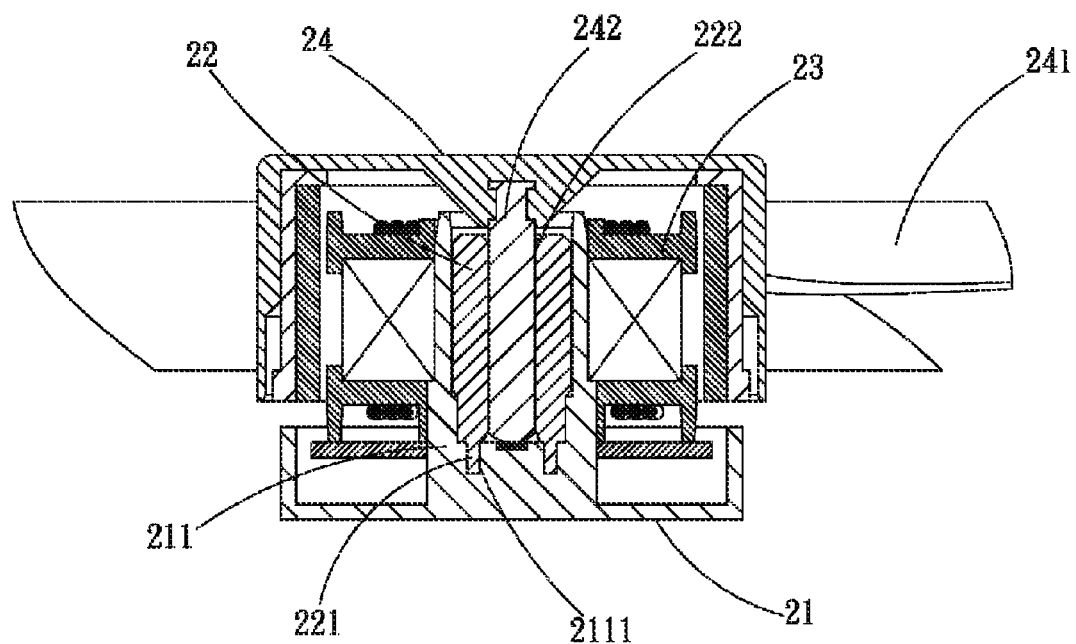
FIG. 2C is a sectional assembled view of the first embodiment of the present invention.

Please refer to FIGS. 2A, 2B and 2C. FIG. 2A is a perspective exploded view of a first embodiment of the present invention. FIG. 2B is a perspective sectional exploded view of the first embodiment of the present invention. FIG. 2C is a sectional assembled view of the first embodiment of the present invention. According to the first embodiment, the fan device 2 of the present invention includes a base seat 21, an oil-retaining bearing 22, a stator assembly 23 and a fan impeller 24. The base seat 21 has a central tubular section 211 on one side and a bearing cup 212 extending from the central tubular section 211. The bearing cup 212 has an internal bearing hole 2121. The central tubular section 211 has at least one mating section 2111 in adjacency to the bearing hole 2121. In this embodiment, the mating section 2111 is, but not limited to, multiple sockets formed on the surface of the central tubular section 211. The oil-retaining bearing 22 is disposed in the bearing hole 2121. The oil-retaining bearing 22 has at least one connection section 221 in adjacency to the central tubular section 211. The oil-retaining bearing 22 further has an internal shaft hole 222. In this embodiment, the connection section 221 is multiple protrusions protruding from the surface of the oil-retaining bearing 22. The connection section 221 is mated with the mating section 2111.

The stator assembly 23 is fitted around the bearing cup 212. The fan impeller 24 is assembled with the stator assembly 23 and the oil-retaining bearing 22 on one side opposite to the base seat 21. The fan impeller 24 has multiple blades 241 and a shaft 242. The shaft 242 is fitted through the shaft hole 222. When the connection section 221 of the oil-retaining bearing 22 is mated with the mating section 2111 of the central tubular section 211, the connection section 221 is fitted in the mating section 2111 by means of press fit to apply equal force to two sides thereof. In this case, the shaft hole 222 is prevented from being contracted so that the shaft 242 in the shaft hole 222 will not be compressed. In addition, when the oil-retaining bearing 22 is fixed in the bearing cup 212 by means of glue dispensing process, the connection section 221 serves to hinder the glue from flowing to the shaft hole 222. Accordingly, the oil-retaining bearing 22 can be securely fixed and the operation of the shaft 242 will not be affected due to the press fit and the difficulty in controlling the glue dispensing process. Moreover, the lifetime of the fan device can be prolonged and the assembling cost is lowered.

Figure 3:
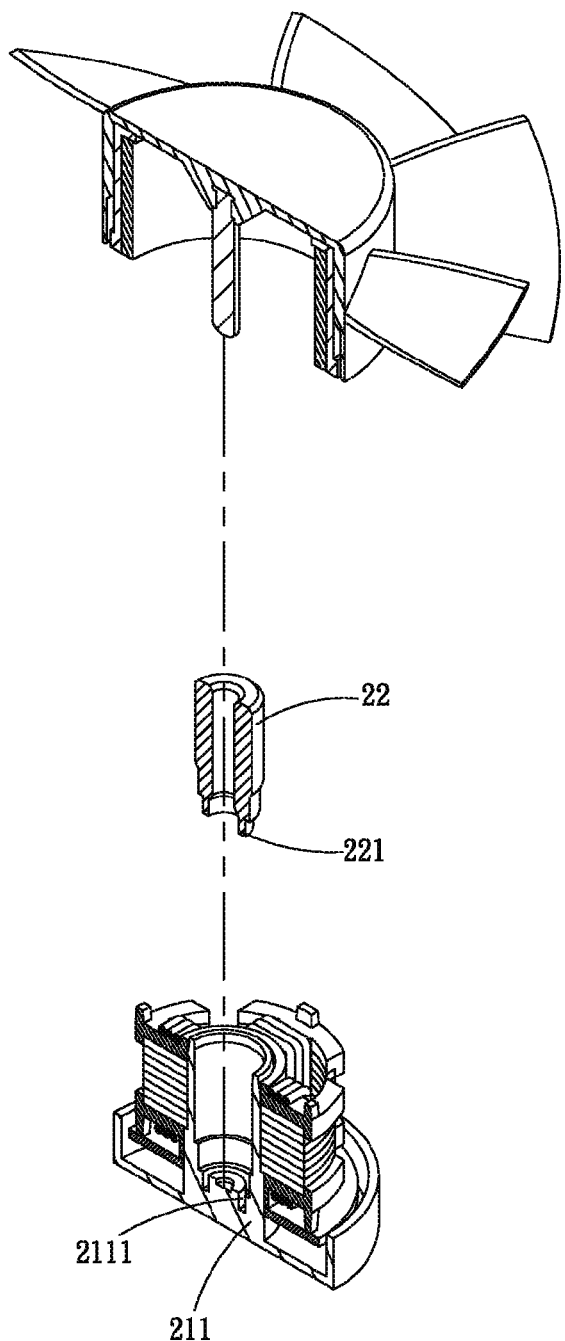
FIG. 3 is a perspective sectional exploded view of a second embodiment of the present invention.

Please now refer to FIG. 3, which is a perspective sectional exploded view of a second embodiment of the present invention. The second embodiment is substantially identical to the first embodiment in component, connection relationship and operation and thus will not be repeatedly described hereinafter. The second embodiment is different from the first embodiment in that the mating section 2111 of the second embodiment is an annular groove formed on the surface of the central tubular section 211. The connection section 221 of the oil-retaining bearing 22 is an annular protrusion protruding from the surface of the oil-retaining bearing 22 in adjacency to the central tubular section 211. Accordingly, when the connection section 221 of the oil-retaining bearing 22 is mated with the mating section 2111 of the central tubular section 211, the connection section 221 is fitted in the mating section 2111 by means of press fit to apply equal force to two sides thereof. In this case, the oil-retaining bearing 22 can be securely fixed and the operation of the shaft 242 will not be affected due to the press fit and the difficulty in controlling the glue dispensing process.

Figure 4A:
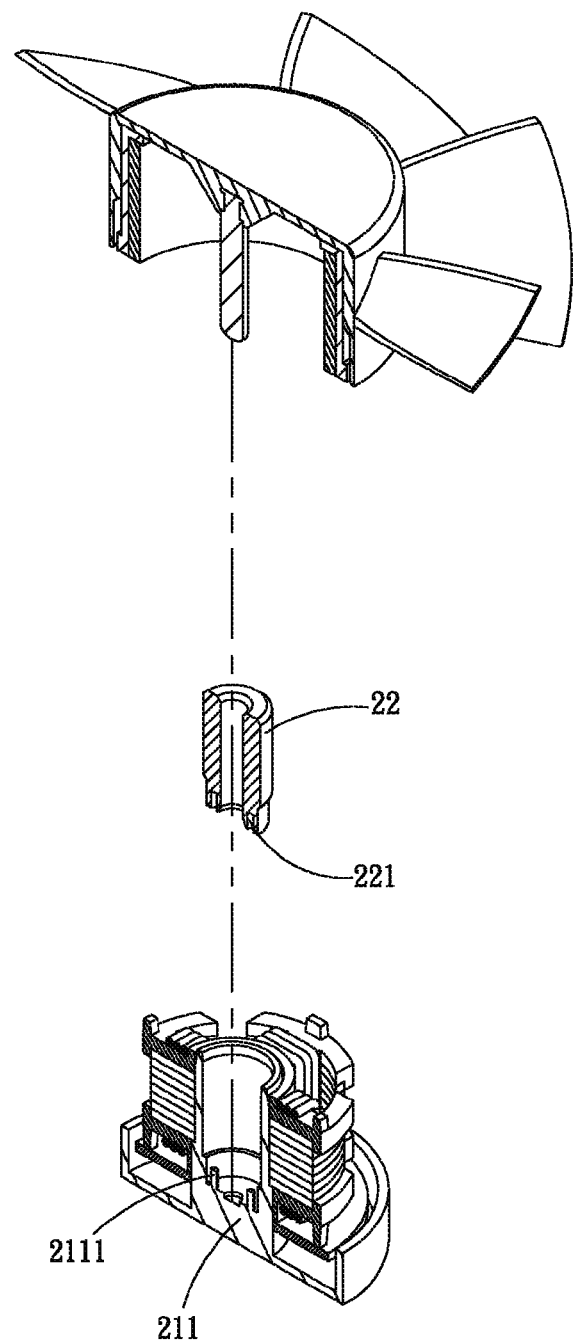
FIG. 4A is a perspective sectional exploded view of a third embodiment of the present invention.
Figure 4B:
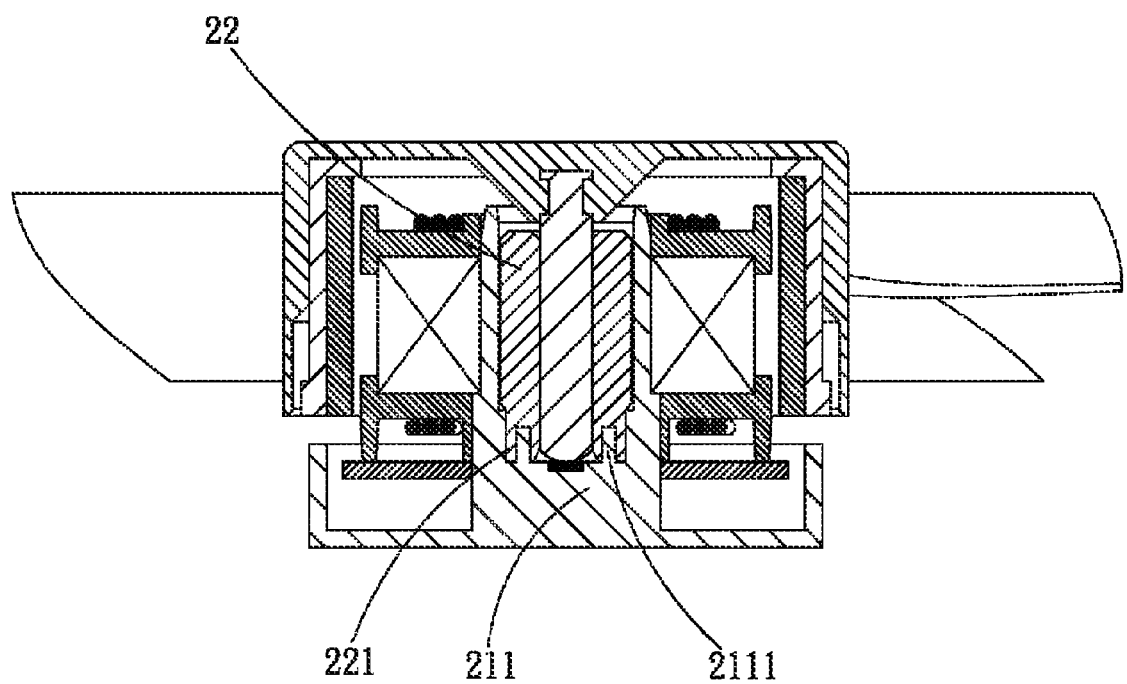
FIG. 4B is a sectional assembled view of the third embodiment of the present invention.

Please now refer to FIGS. 4A and 4B. FIG. 4A is a perspective sectional exploded view of a third embodiment of the present invention. FIG. 4B is a sectional assembled view of the third embodiment of the present invention. The third embodiment is substantially identical to the first embodiment in component, connection relationship and operation and thus will not be repeatedly described hereinafter. The third embodiment is different from the first embodiment in that the mating section 2111 of the third embodiment is multiple protrusions protruding from the surface of the central tubular section 211. The connection section 221 of the oil-retaining bearing oil-retaining bearing 222 is multiple sockets formed on the surface of the oil-retaining bearing 22 in adjacency to the central tubular section 211. Accordingly, when the connection section 221 of the oil-retaining bearing 22 is mated with the mating section 2111 of the central tubular section 211, the connection section 221 is fitted in the mating section 2111 by means of press fit to apply equal force to two sides thereof. In this case, the oil-retaining bearing 22 can be securely fixed and the operation of the shaft 242 will not be affected due to the press fit and the difficulty in controlling the glue dispensing process.

Figure 5:
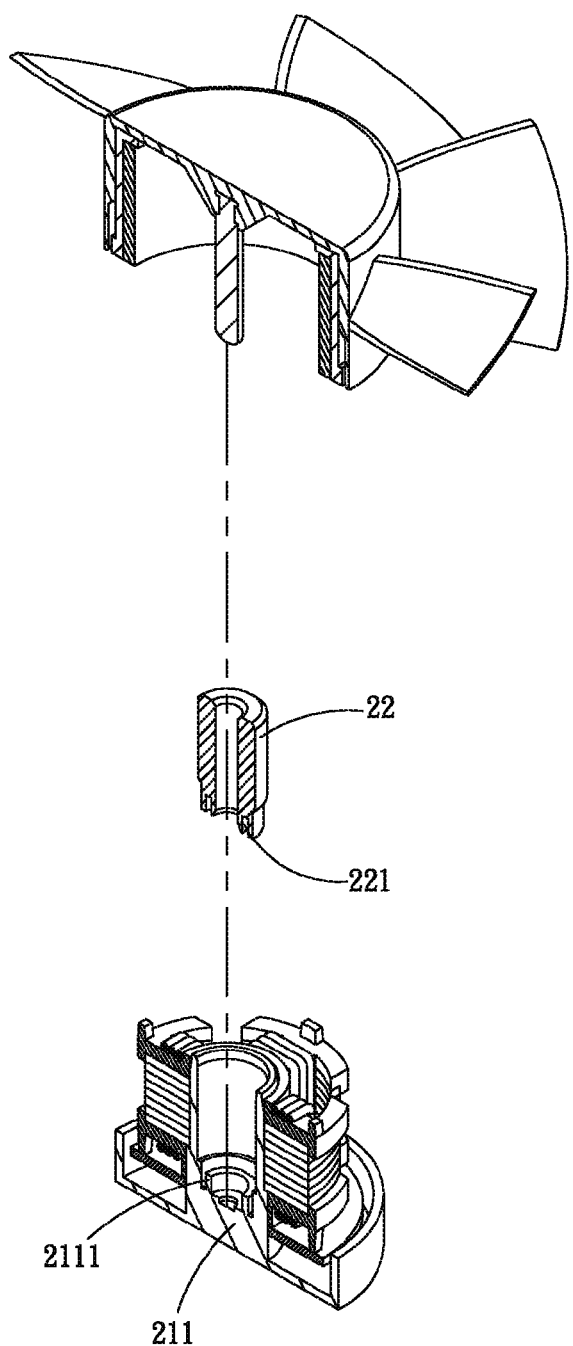
FIG. 5 is a perspective sectional exploded view of a fourth embodiment of the present invention.

Please now refer to FIG. 5, which is a perspective sectional exploded view of a fourth embodiment of the present invention. The fourth embodiment is substantially identical to the first embodiment in component, connection relationship and operation and thus will not be repeatedly described hereinafter. The fourth embodiment is different from the first embodiment in that the mating section 2111 of the fourth embodiment is an annular protrusion protruding from the surface of the central tubular section 211. The connection section 221 of the oil-retaining bearing 22 is an annular groove formed on the surface of the oil-retaining bearing 22 in adjacency to the central tubular section 211. Accordingly, when the connection section 221 of the oil-retaining bearing 22 is mated with the mating section 2111 of the central tubular section 211, the connection section 221 is fitted in the mating section 2111 by means of press fit to apply equal force to two sides thereof. In this case, the oil-retaining bearing 22 can be securely fixed and the operation of the shaft 242 will not be affected due to the press fit and the difficulty in controlling the glue dispensing process.

In conclusion, the fan device with oil-retaining bearing is novel and can be reliably used.

The present invention has been described with the above embodiments thereof and it is understood that many changes and modifications in the above embodiments can be carried out without departing from the scope and the spirit of the invention that is intended to be limited only by the appended claims.

What is claimed is:

1. A fan device with oil-retaining bearing, comprising:
a base seat having a central tubular section and a bearing cup extending from the central tubular section, the bearing cup having a bearing hole, the central tubular section having a surface with at least one mating section in adjacency to the bearing hole;
an oil-retaining bearing disposed in the bearing hole, the oil-retaining bearing having at least one connection section mated with the mating section; and
a stator assembly fitted around the bearing cup;
wherein the mating section is a plurality of sockets, the connection section is a plurality of protrusions to insert in the plurality of sockets;
wherein each socket has a vertical notch that goes into the central tubular section below the surface, the vertical notch having two inside walls to hold the protrusions.

2. The fan device with oil-retaining bearing as claimed in claim 1, wherein the oil-retaining bearing has a shaft hole.

3. The fan device with oil-retaining bearing as claimed in claim 1, further comprising a fan impeller having multiple blades and a shaft.

\* \* \* \* \*